United States Patent
Sheridan et al.

(10) Patent No.: US 7,377,110 B2
(45) Date of Patent: May 27, 2008

(54) DEOILER FOR A LUBRICATION SYSTEM

(75) Inventors: William G. Sheridan, Southington, CT (US); J. Axel Glahn, Manchester, CT (US); James T. Thoresen, Glastonbury, CT (US); Larry W. Spires, Unionville, CT (US); Yuan Dong, Glastonbury, CT (US); Sean P. McCutchan, Hamden, CT (US)

(73) Assignee: United Technologies Corporation, Hartford, CT (US)

( * ) Notice: Subject to any disclaimer, the term of this patent is extended or adjusted under 35 U.S.C. 154(b) by 692 days.

(21) Appl. No.: 10/815,125

(22) Filed: Mar. 31, 2004

(65) Prior Publication Data

US 2005/0217272 A1    Oct. 6, 2005

(51) Int. Cl.
*F02C 7/06* (2006.01)
(52) U.S. Cl. ............................ 60/772; 60/39.08
(58) Field of Classification Search ............ 60/772, 60/39.08; 55/342, 345
See application file for complete search history.

(56) References Cited

U.S. PATENT DOCUMENTS 2,774,444 A * 12/1956 Soddy .................. 55/345
4,683,714 A * 8/1987 Thebert .................. 60/772
4,877,431 A * 10/1989 Avondoglio .............. 55/345
5,114,446 A * 5/1992 Giersdorf et al. .......... 55/345

* cited by examiner

*Primary Examiner*—Igor Kershteyn

(57) ABSTRACT

A deoiler 26 for separating oil from air contaminated with the oil has at least one separator for separating the oil from the air and also has a source of suction for reducing air pressure at the source of the air. In an exemplary embodiment, the deoiler 26 creates the suction at a first operating condition, but acts as a restrictor at a second operating condition. A deoiling method according to the invention creates suction at a first operating condition to reduce the air pressure at the source of the oil-contaminated air, establishes a flow restriction at a second operating condition to pressurize the air source, and encourages oil to separate from the air at both operating conditions. When used as a component of a turbine engine lubrication system 22, the source of contaminated air may be a buffered bearing compartment 16. The inventive deoiler ensures a positive pressure difference across the bearing compartment seals 20 at the engine's idle power setting without requiring the idle setting to be undesirably high, and without requiring the use of buffer air whose pressure at higher engine power is high enough to be detrimental. In an exemplary embodiment, the deoiler pressurizes the bearing compartment at higher power settings to resist excessive buffer air infiltration into the bearing compartment.

7 Claims, 5 Drawing Sheets

DEOILER FOR A LUBRICATION SYSTEM

TECHNICAL FIELD

This invention relates to lubrication system deoilers of the type useful in an aircraft gas turbine engine, and particularly to a deoiler that establishes a desirable pressure difference across the engine bearing compartment seals irrespective of engine power.

BACKGROUND OF THE INVENTION

A typical, conventional gas turbine engine includes one or more multi-stage compressors, a combustor, and one or more turbines. An annular working medium flowpath extends through the compressors, combustor and turbines. A drive shaft connects each turbine to an associated compressor. At least one of the drive shafts is supported from the nonrotatable structure of the engine by bearings, which are enclosed in a bearing compartment. A lubrication system introduces oil or other lubricant into the bearing compartment to lubricate and cool the bearings, and also reconditions the oil for re-use. Bearing compartment seals help prevent oil leakage out of the compartment by segregating the interior of the compartment from its local environment.

It is common practice to buffer the bearing compartment seals to enhance their ability to resist oil leakage. Buffering refers to directing pressurized air to the vicinity of the seals, outside the bearing compartment. The buffer air is usually pressurized air extracted from the working medium flowpath, specifically from the compressor flowpath. The pressure of the buffer air exceeds the prevailing pressure inside the bearing compartment. This results in a favorable, positive pressure difference across the compartment seals. Because of the positive pressure difference, buffer air flows into the compartment, helping to confine the oil.

The designer of the lubrication system must select a satisfactory location (i.e. stage) in the compressor from which to extract the buffer air. Air extracted from a higher pressure stage of the compressor has the advantage of establishing a sizeable positive pressure difference across the bearing compartment seals. This allows a large quantity of buffer air to flow into the compartment, which forms a highly effective barrier against oil leakage. However the large quantity of pressurized air can also cause the oil in the bearing compartment to foam, which compromises its lubricating and heat transfer properties. In addition, the high pressure air has a correspondingly high temperature. Introducing a large quantity of high temperature air into the bearing compartment could ignite and sustain a fire inside the compartment.

The designer can guard against oil foaming and mitigate the risk of fire by choosing to extract the buffer air from a lower pressure stage of the compressor. When the engine operates at high power, this lower stage buffer air will have enough pressure to maintain a positive pressure difference across the bearing compartment seals. However when the engine operates at lower power settings, including idle, the pressure throughout the compressor, and therefore the pressure of the lower stage buffer air, will be significantly reduced. In order to guarantee that the lower stage buffer air doesn't compromise the positive pressure difference across the bearing compartment seals at low engine power, it may be necessary to operate the engine at an undesirably high idle setting. In other words, the need to always maintain a positive pressure difference across the bearing compartment seals (in order to prevent oil leakage), in combination with the use of low stage buffer air, may demand an undesirably high idle power setting. A high idle setting is undesirable because it promotes excessive engine fuel consumption. Moreover, if the engine is used as an aircraft powerplant, a high idle setting can make the aircraft more difficult to handle during descent and taxiing maneuvers. Of course, the designer can overcome these problems by choosing to extract the buffer air from a higher pressure stage of the compressor, but doing so re-introduces the foaming and fire risk sought to be avoided by selecting a lower pressure air source in the first place.

The task of selecting an appropriate buffer air source without requiring an undesirably high idle power setting is further complicated by the presence of a deoiler in the lubrication system. The buffer air and the lubricating oil cross-contaminate each other in the bearing compartment. The deoiler receives the oil-contaminated air, now referred to as breather air, and separates the oil from the air so that the oil can be re-used. The lubrication system then vents the decontaminated breather air into the atmosphere. The deoiler is a desirable component because the contaminated air would contribute to air pollution if it were discharged, untreated, directly into the atmosphere. Moreover, if the oil were vented overboard with the breather air, it would be necessary to carry a larger supply of oil on the aircraft thereby increasing aircraft weight and consuming precious space.

Unfortunately, a conventional lubrication system deoiler also pressurizes the bearing compartment by restricting the flow of breather air out of the compartment. In other words, the presence of a conventional deoiler causes the bearing compartment pressure to be higher than it would be if the bearing compartment were vented directly to the atmosphere. This elevated compartment pressure requires that the buffer air pressure also be correspondingly elevated in order to ensure a positive pressure difference across the bearing compartment seals at all ambient conditions and engine power settings, including idle. This elevated compartment pressure can be beneficial at high engine power settings because it helps prevent excessive infiltration of hot, high pressure buffer air into the compartment. But at lower power settings, the elevated compartment pressure, in combination with the use of lower stage buffer air, can require an unsatisfactorily high idle power setting to ensure a positive pressure difference across the bearing compartment seals.

SUMMARY OF THE INVENTION

It is, therefore, an object of the invention to provide a deoiler that reduces the bearing compartment pressure, particularly at lower engine power settings.

It is a further object to provide a deoiler that can also pressurize the bearing compartment at higher power settings.

It is another object of the invention to provide a method of deoiling that reduces pressure at a source of oil-contaminated air at one operating condition and that can pressurize the source of contaminated air at a second operating condition.

According to the invention, a lubrication system deoiler includes at least one separator for separating oil from oil-contaminated air, and also includes a source of suction for reducing pressure at the source of the contaminated air. In an exemplary embodiment, the deoiler creates the suction at a first operating condition, but acts as a restrictor at a second operating condition.

A deoiling method according to the invention creates suction at a first operating condition to reduce the air pressure at a source of oil-contaminated air, establishes a flow restriction at a second operating condition to pressurize the air source, and encourages oil to separate from the air at both conditions of operation.

The principal advantage of the inventive deoiler is that it ensures a positive pressure difference across the bearing compartment seals at the engine's idle power setting without requiring the idle setting to be undesirably high, and without requiring the use of buffer air whose pressure at higher engine power is high enough to cause oil foaming or risk of a bearing compartment fire.

A related advantage is that the deoiler can pressurize the bearing compartment at higher power settings to resist excessive buffer air infiltration into the bearing compartment.

BEST MODE FOR CARRYING OUT THE INVENTION

Figure 1:
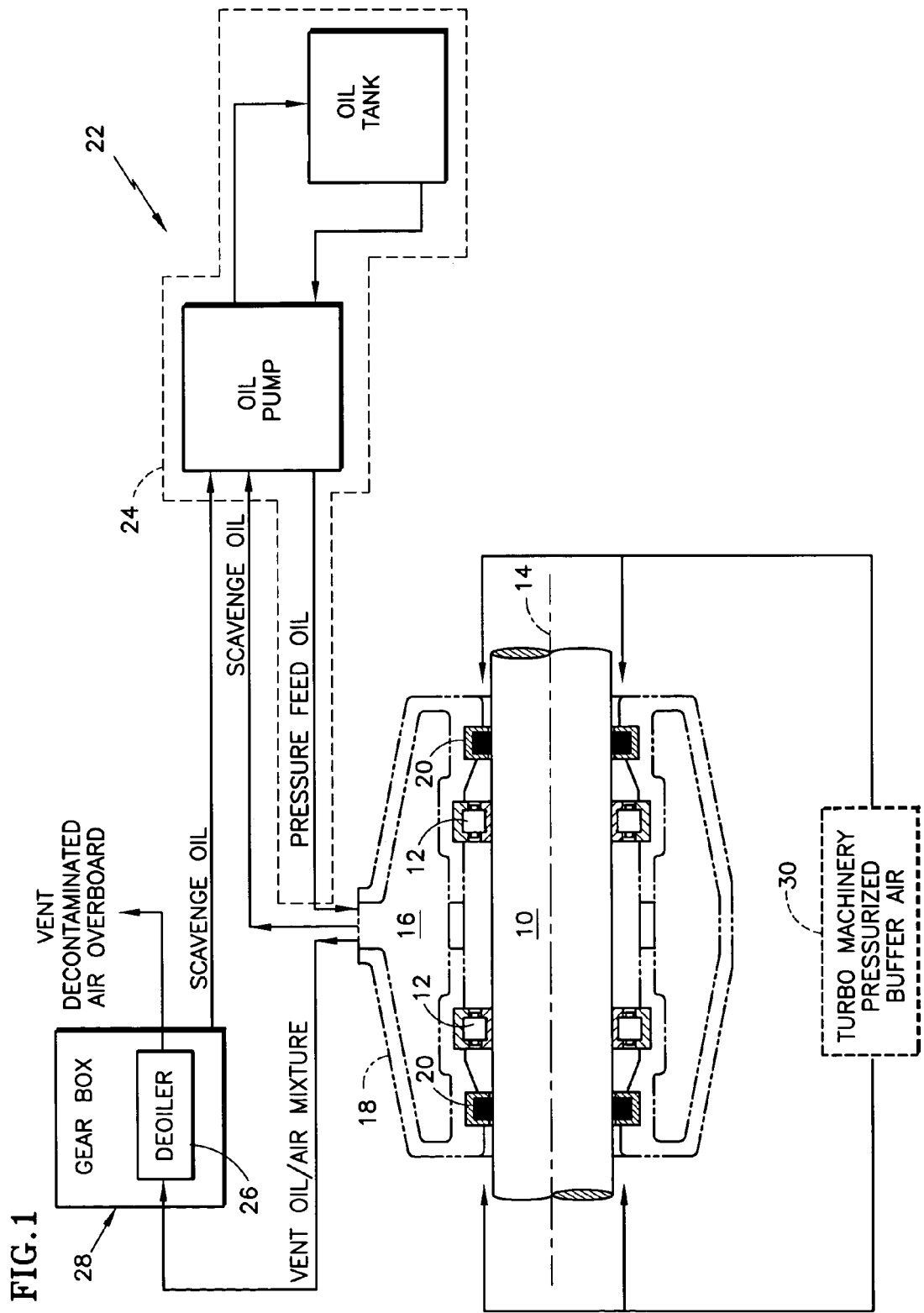
FIG. 1 is a schematic illustration showing a bearing compartment and components of a lubrication system, including a deoiler.

Referring to FIG. 1, a turbine engine shaft 10 is supported from the nonrotatable structure of the engine by bearings 12 so that the shaft is rotatable about a centerline axis 14. The bearings are enclosed in a bearing compartment 16 bounded by a compartment housing 18 and by the shaft. Seals 20 segregate the compartment from its immediate surroundings. These seals are imperfect, i.e. they allow some leakage, despite being designed and manufactured according to exacting standards.

A lubrication system 22 includes a lubricant supply subsystem 24 comprising a pump, an oil tank, supply lines, and other components not illustrated. The supply subsystem introduces oil into the bearing compartment. The lubrication system also includes a deoiler 26, which is typically enclosed inside an engine gearbox 28. The lubrication system also includes a buffering subsystem 30, which extracts pressurized air, referred to as buffer air, from the engine's working medium flowpath and delivers it to the vicinity of the seals 20 outside the bearing compartment. The pressure of the buffer air exceeds the prevailing pressure inside the bearing compartment, thus establishing a positive pressure difference across the seals 20.

During engine operation, the oil lubricates and cools the bearings 12. The positive pressure difference across the seals 20 causes buffer air to flow past the seals and into the compartment 16 to help prevent oil from leaking past the seals in the opposite direction. The air and oil cross-contaminate each other in the compartment. The oil-contaminated air, now referred to as breather air, flows out of the compartment to the deoiler and is replenished by fresh buffer air flowing past the compartment seals. The deoiler separates the oil from the air, vents the decontaminated air overboard, and discharges the separated oil to the oil pump.

Figure 2:
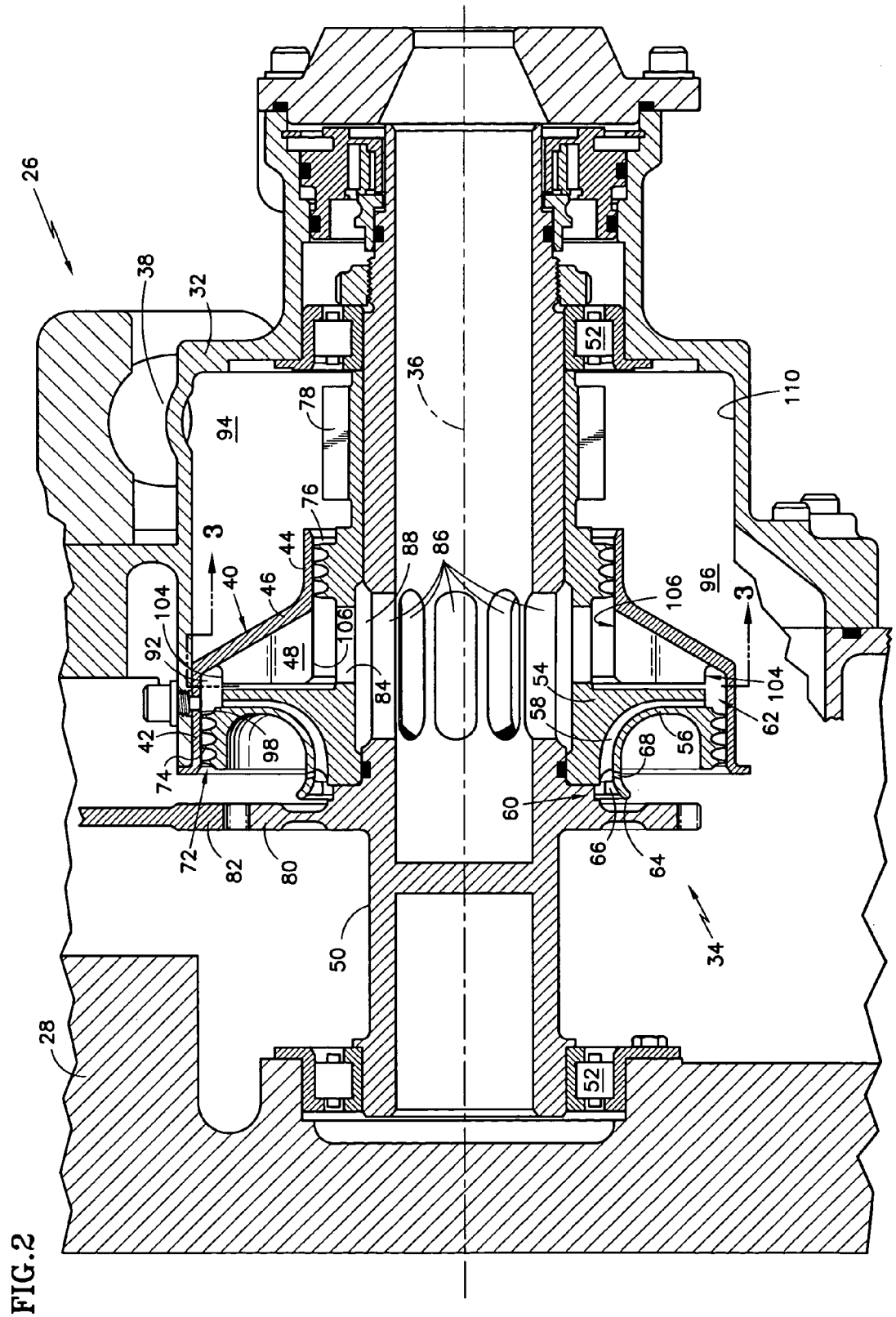
FIG. 2 is a cross sectional side elevation view showing one embodiment of a deoiler according to the present invention.

FIG. 2 shows the deoiler 26 positioned inside gearbox 28. The deoiler includes a nonrotatable housing 32, which circumscribes a rotor assembly 34 and its rotational centerline axis 36. An intake 38 penetrates through the housing. The intake communicates with the bearing compartment 16 (FIG. 1). A compressor case 40 comprised of a large diameter cylinder 42, a small diameter cylinder 44 and a frustoconical partition 46 nests inside the housing. Circumferentially distributed stator vanes 48 extend radially inwardly from the case toward the centerline 36. Collectively, the stator vanes define a stator stage.

The rotor assembly 34 includes a hollow deoiler shaft 50 rotatably mounted on bearings 52 and a centrifugal compressor rotor circumscribing the shaft. The compressor rotor includes a hub 54, a seal plate 56 and an array of circumferentially distributed impeller blades 58 spanning across the space between the hub and the seal plate. The compressor inlet and outlet 60, 62 are at the radially inner and outer ends respectively of the impeller blades. The radially inner end of the seal plate includes a flared or "bellmouth" lip 64, a set of circumferentially distributed teeth 66, and a set of circumferentially distributed oil recovery passages 68. The radially outer end of the seal plate includes a labyrinth seal 72 comprised of several individual knife edge rings 74. The rings extend radially toward the large diameter case cylinder 42, but their radially outermost edges are radially spaced from the case by a small amount not discernible in the illustration. Hence, the seal is slightly leaky for reasons described hereinafter.

The compressor rotor also includes a second labyrinth seal 76, comprised of individual knife edge rings extending radially toward the small diameter case cylinder 44 and a set of circumferentially distributed, radially projecting paddles 78 that define a paddlewheel.

A pinion 80 meshes with a drive gear 82 that rotates the deoiler shaft at a speed proportional to the rotational speed of an engine shaft, such as shaft 10 (FIG. 1).

Two sets of circumferentially distributed holes 84, 86 penetrate the compressor rotor and the deoiler shaft respectively. An annular air distribution chamber 88 registers with the holes.

When assembled, as shown in FIG. 2, the compressor rotor and the case 40 cooperate to define an annular plenum 92. The labyrinth seal 72 is therefore referred to as a plenum seal. In addition, the housing 32, partition 46, and compressor rotor cooperate to define an annular receiving chamber 94 having a circumferentially localized outlet scoop 96.

The compressor is designed so that it operates very efficiently and has good flow capacity at low rotational speed, particularly at or near engine idle speed. At higher speeds, it operates less efficiently, and has poorer flow capacity in relation to its speed.

The deoiler includes three separators for separating oil from oil-contaminated air. An auxiliary separator, representing a first stage of separation, comprises the paddles 78 and outlet scoop 96. A second separator, representing a second stage of separation, comprises the surfaces of teeth 66 and oil recovery passages 68 at the compressor inlet. A third separator, representing a third stage of separation, comprises radially inner surface 98 of cylinder 42 and an oil recovery passage extending past the plenum seal 72 at the compressor outlet.

Figure 3:
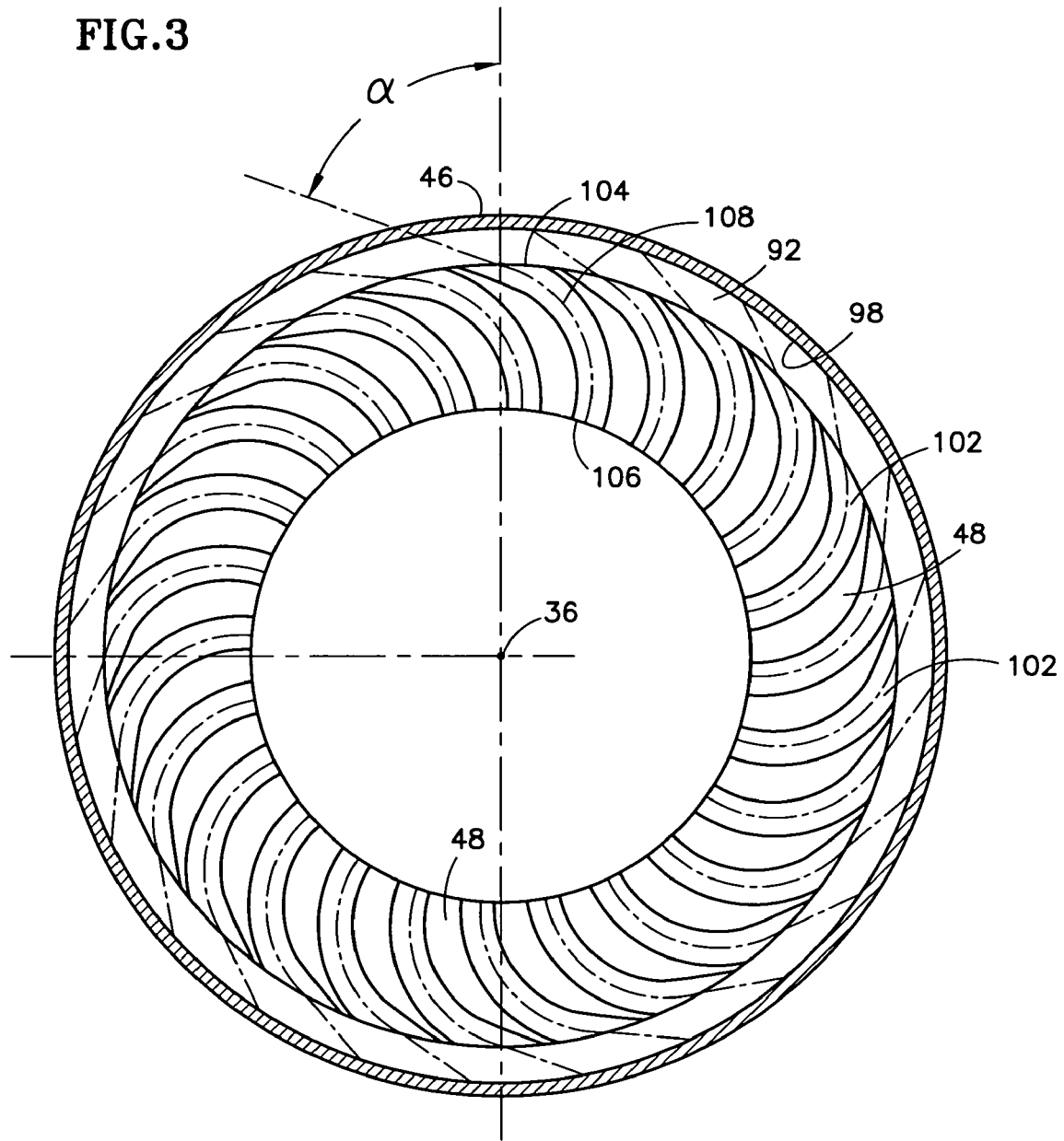
FIG. 3 is a view taken along the line 3-3 of FIG. 2.

Referring to FIG. 3, the stator vanes 48 are separated from each other by intervene passages 102, each having an inlet 104, an outlet 106 and a meanline 108. Each meanline forms an angle a with a radial line that intersects the meanline at the passage inlet. In the illustrated embodiment, the angle a is about 70 degrees. Despite the appearance of the passages in FIG. 3, the cross sectional area of each passage increases from the inlet 104 to the outlet 106. This is because the axial dimension of each passage increases from the inlet to the outlet, as seen best in FIG. 2. The significance of the increasing area is that it converts much of the high kinetic energy of the fluid in plenum 92 into static pressure, thereby avoiding excessive aerodynamic losses downstream of the plenum 92.

In operation, oil-contaminated air from an air source, such as bearing compartment 16 (FIG. 1) flows into the receiving chamber 94 by way of intake 38. The contaminated air enters the chamber with an appreciable circumferential (tangential) velocity component that the paddles 78 help to amplify and sustain. As a result, the heavier oil tends to be centrifuged radially outwardly where it can coalesce on surface 110 and return to the gearbox through the scoop 96. The air, now partially decontaminated, also discharges through the scoop and flows to the centrifugal compressor.

The air enters the centrifugal compressor by flowing past the bellmouth lip 64 and teeth 66. Oil tends to coalesce on the surfaces of the teeth and then return to the gearbox through the recovery passages 68. Because the aggregate surface area of the teeth is considerable, the teeth represent a highly effective oil collection surface.

The compressor then compresses the air, which now has benefitted from two stages of oil separation. The air discharges into the plenum 92 with a large circumferential velocity component. Centrifugal force urges the heavy oil radially outwardly where it coalesces on oil collection surface 98. Because the plenum seal is slightly leaky, as described in paragraph 0024, and because the pressure in the plenum is elevated, the oil collected on surface 98 flows past the plenum seal and into the gearbox.

The air, which has now passed through three stages of oil separation, is now substantially decontaminated. It will be recognized that "decontaminated" air may still contain some oil, but is nevertheless cleaner than the contaminated air received in the receiving chamber 94. The air then enters the intervane passages 102 (FIG. 3). Because the air has a substantial circumferential velocity component, the orientation of the passage inlets at angle a facilitates capture of the air. The decontaminated air then flows through the intervene passages 102, holes 84, distribution chamber 88, holes 86, along the interior of deoiler shaft 50 and finally overboard into the atmosphere. The flow of air is driven by the pressure difference between the plenum and the atmosphere.

The above described operation of the deoiler occurs irrespective of engine power and speed, however another aspect of deoiler operation depends on speed to achieve the objectives of the invention. At low engine speed, such as idle, the centrifugal compressor operates efficiently and with a high flow capacity. Accordingly, the compressor ingests air more quickly than it can be replenished by buffer air flowing past the bearing compartment seals 20. As a result, the compressor creates a suction that draws down the pressure in the bearing compartment. The reduced bearing compartment pressure helps to ensure a positive pressure difference across the compartment seals at low engine power including idle, even if the buffer air is extracted from a low pressure stage of the engine compressor.

At higher engine speed, the centrifugal compressor operates less efficiently and with poorer flow capacity in relation to its speed. Airflow into the compressor becomes choked. As a result, the deoiler restricts the flow of breather air out of the bearing compartment, which pressurizes the compartment. The elevated compartment pressure helps compensate for the increase in buffer air pressure that occurs as a result of operating the engine at higher power. Accordingly, although buffer air can still flow into the compartment to help resist oil leakage, infiltration of excessive quantities of buffer air, and the problems arising from such infiltration, is prevented.

Thus, it is seen that the deoiler is operable at a first operating condition (lower range of engine power and speed) in which it suctions the contaminated air from the bearing compartment thereby establishing a positive pressure difference across the imperfect compartment seal 20. The deoiler is also operable at a second operating condition (higher range of engine power and speed) in which it acts as a restriction, thereby pressurizing the compartment without jeopardizing the positive pressure difference across the seals 20.

Figure 4:
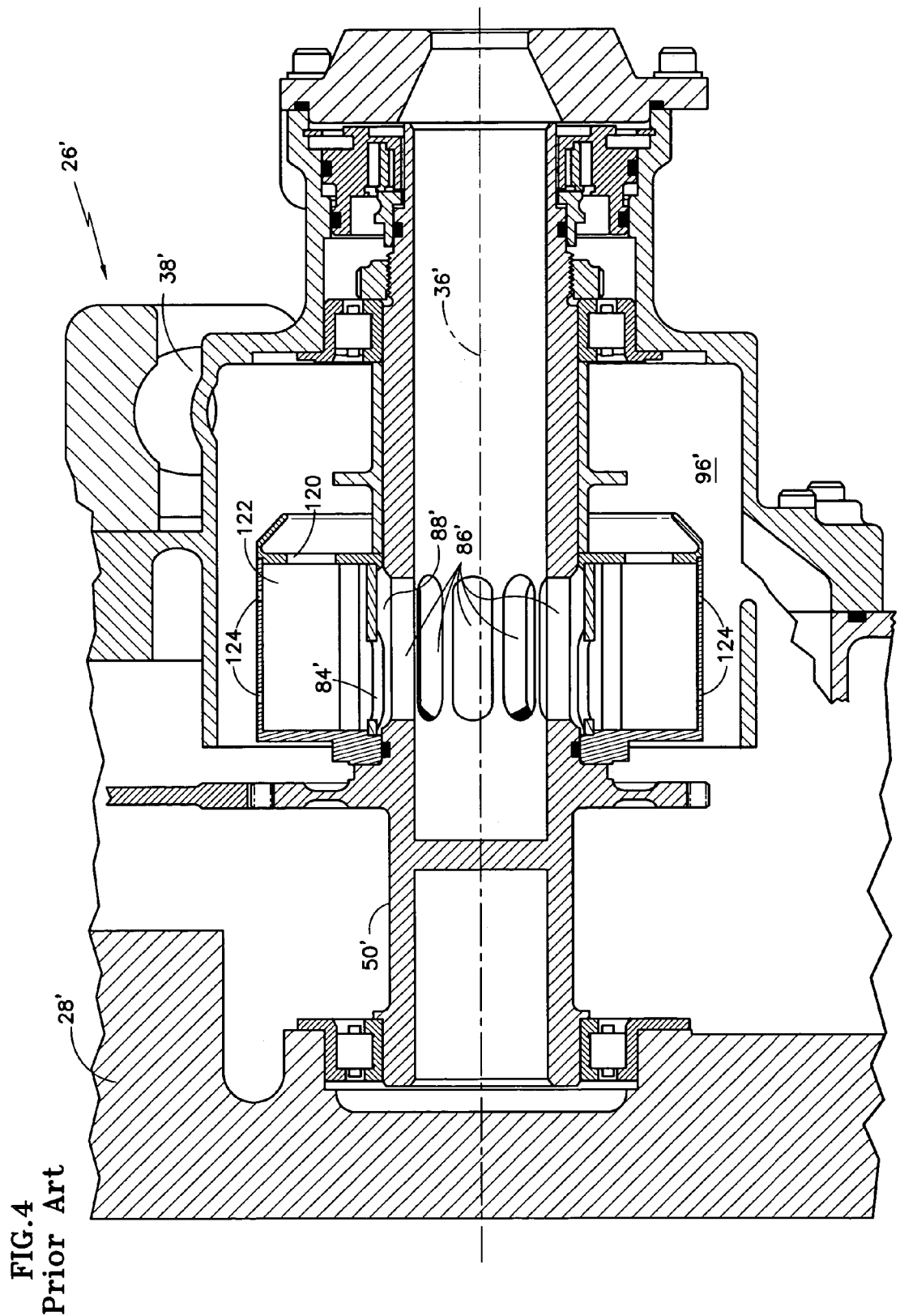
FIG. 4 is a cross sectional side elevation view similar to FIG. 2 showing a conventional deoiler.

FIG. 4 illustrates a conventional deoiler. Features analogous to those shown in FIG. 2 are identified with primed reference numerals. Oil-contaminated air enters through intake 38'. Because the air has a substantial circumferential velocity component, a fraction of the oil is centrifuged radially outwardly and returns to the gearbox 28' through the scoop 96'. However the conventional deoiler is less effective than the inventive deoiler whose paddles 78 help amplify and sustain the circumferential motion. The air then flows through discrete openings 120 and enters an impeller 122. The impeller blades centrifuge the oil radially outwardly, allowing it to discharge through peripheral passages 124. The air then vents to the atmosphere by flowing through holes 84', annulus 88', holes 86' and finally along the interior of the deoiler shaft 50'.

The conventional deoiler, unlike the inventive deoiler, fails to create suction for drawing down the pressure in the bearing compartment. On the contrary, the conventional deoiler restricts the flow of air at all operating conditions, thus pressurizing the compartment at all operating conditions with the detrimental effects described above. In addition, the conventional deoiler offers only two stages of oil separation, whereas the inventive deoiler offers three stages as described earlier.

Figure 5:
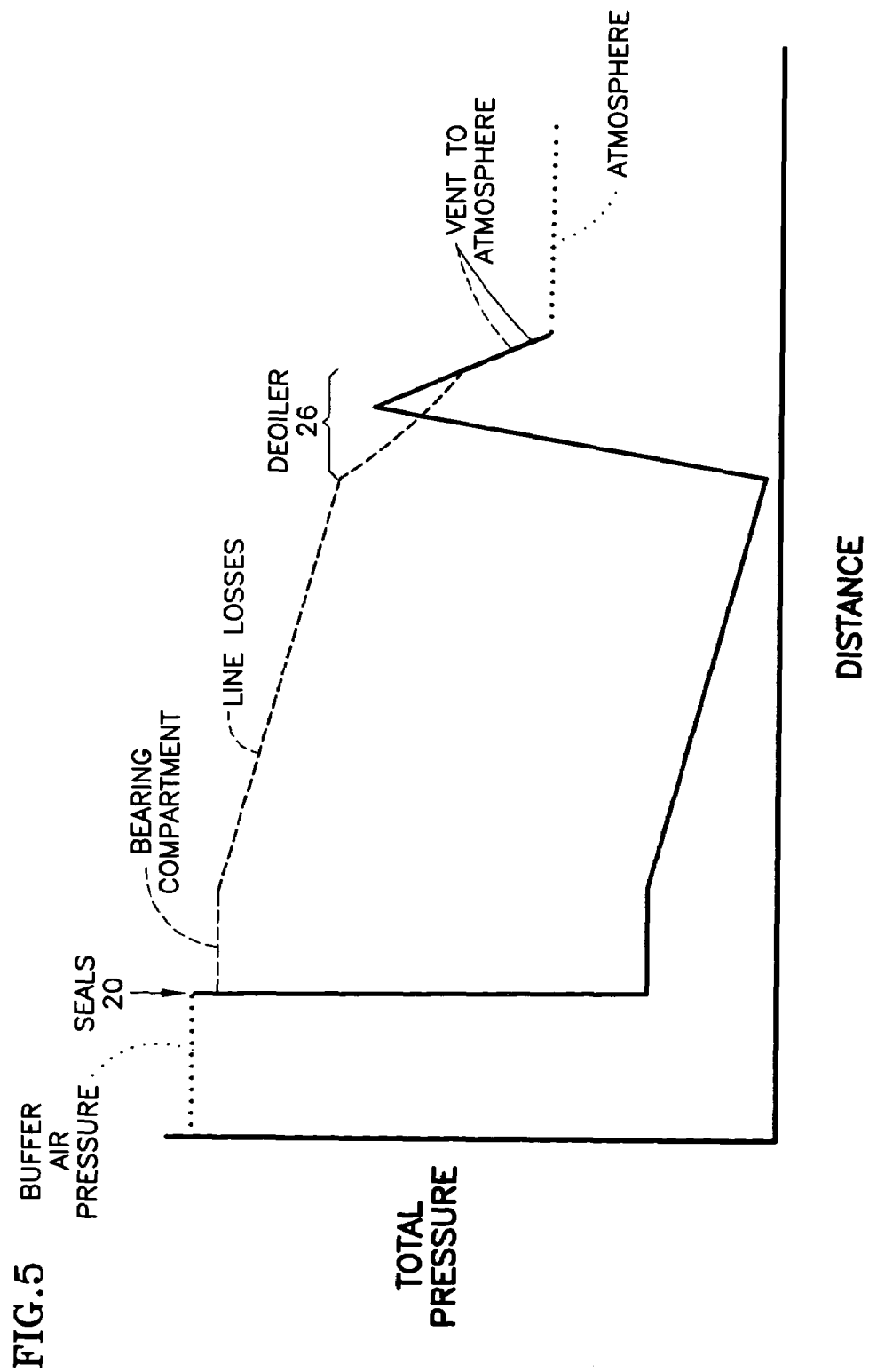
FIG. 5 is a simplified graph of total pressure vs. distance comparing the operation of the inventive deoiler with that of a conventional deoiler.

FIG. 5 is a graph of air pressure vs. distance comparing the inventive deoiler to a conventional deoiler when operating at or near engine idle speed. In a conventional deoiler (broken lines) the buffer air experiences a pressure drop across the compartment seals 20. Inevitable line losses cause a further drop in pressure between the compartment and the deoiler. The deoiler, because it acts as a restriction throughout its range of operating speeds, imposes an additional pressure loss. As a result, the compartment pressure has to be high enough to accommodate both the line losses and the deoiler pressure drop. This, in turn, limits the pressure difference across the compartment seals for a given buffer air pressure. Therefore, it may be necessary to operate the engine at an undesirably high idle setting to ensure a positive pressure difference across the seal and resist oil leakage.

The inventive deoiler (solid lines) creates a suction at idle power that draws down the pressure in the compartment, although not necessarily below atmospheric. pressure as shown in the illustration. The compartment pressure is therefore low enough to ensure a positive pressure difference across the bearing compartment seals, even at a low idle setting. The deoiler compressor repressurizes the air so that it can vent to the atmosphere. At higher engine power settings, the inventive deoiler operates more like the conventional deoiler.

Although the illustrated deoiler is shown in the context of bearing compartment seals between a rotatable shaft and a nonrotatable structure (the bearing compartment itself), it is also useful for maintaining a positive pressure difference across seals between shafts that rotate at different speeds, including counter rotating shafts. The deoiler also has applicability to turbine engines used in applications other than aircraft, such as marine propulsion and power generation. Moreover, it is clear that in the context of the invention, liquids other than oil are the equivalents of oil, and gases other than air are the equivalents of air. Accordingly, the deoiler may find applicability for separating the liquid and gaseous components of other liquid-gas mixtures.

Although this invention has been shown and described with reference to a detailed embodiment thereof, it will be understood by those skilled in the art that various changes in form and detail may be made without departing from the invention as set forth in the accompanying claims.

We claim:

1. A deoiler capable of communicating with a source of air contaminated with oil, comprising:
   at least one separator for separating the oil from the air;
   a source of suction for reducing pressure at the source of the contaminated air; a compressor for recompressing the air; and
   a stator stage downstream of the compressor for capturing decontaminated air.

2. The deoiler of claim 1 wherein the stator stage includes an array of stator vanes separated by intervene passages each having an inlet and an outlet, each passage increasing in area from its inlet to its outlet.

3. The deoiler of claim 1 wherein the stator stage includes an array of stator vanes separated by intervene passages each having an inlet, an outlet and a meanline, each meanline forming a nonzero angle with respect to a radial line that intersects the meanline at the passage inlet.

4. The deoiler of claim 3 wherein the nonzero angle is about 70 degrees.

5. A deoiler for separating oil from air contaminated with the oil, comprising:
   an intake for admitting the air to the deoiler;
   a first separator comprising a paddlewheel and a deoiler outlet;
   a compressor for receiving the air from the first separator, the compressor comprising a compressor inlet, a stage of blades and a compressor outlet;
   a second separator comprising an array of teeth and an oil recovery passage at the compressor inlet;
   a plenum for receiving air discharged from the compressor outlet, the plenum bounded in part by a plenum seal;
   a third separator comprising an oil collection surface and an oil recovery passage that extends past the plenum seal; and
   a stator stage downstream of the plenum for receiving decontaminated air from the plenum, the stator stage comprising an array of stator vanes separated by intervene passages each having an inlet, an outlet and a meanline, each meanline forming a nonzero angle with respect to a radial line that intersects the meanline at the passage inlet, and each passage increasing in area from its inlet to its outlet.

6. A compartment comprising:
   a shaft and a plurality of spaced bearings, and a seal positioned outwardly of each said bearing;
   a source of pressurized air directed at outer faces of said seals such that a pressurized air source is directed into the compartment between the seals;
   a source of lubricant to be directed into said compartment; and
   a deoiler connected to said compartment at a connection, and operable for separating oil from air, and the deoiler creating a suction at the connection to draw air and entrained oil to the deoiler for separation.

7. The compartment as set forth in claim 6 wherein said deoiler includes a compressor having a rotor and a casing closely surrounding said rotor to create the suction at the inlet.

* * * * *